US012302862B2

(12) United States Patent
Wilhelm et al.

(10) Patent No.: US 12,302,862 B2
(45) Date of Patent: May 20, 2025

(54) PET TOY

(71) Applicant: Doskocil Manufacturing Company, Inc., Arlington, TX (US)

(72) Inventors: Josiah Wilhelm, Fort Worth, TX (US); Ronald Bagley, Dallas, TX (US); Chris Wilson, Arlington, TX (US); Sunil Pinto, Arlington, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 254 days.

(21) Appl. No.: 17/392,345

(22) Filed: Aug. 3, 2021

(65) Prior Publication Data

US 2022/0295744 A1 Sep. 22, 2022

Related U.S. Application Data

(60) Provisional application No. 63/164,021, filed on Mar. 22, 2021.

(51) Int. Cl.
| | |
|---|---|
| *A01K 15/02* | (2006.01) |
| *B29C 65/00* | (2006.01) |
| *B29K 75/00* | (2006.01) |
| *B29L 31/52* | (2006.01) |

(52) U.S. Cl.
CPC .......... *A01K 15/025* (2013.01); *B29C 66/727* (2013.01); *B29K 2075/00* (2013.01); *B29L 2031/52* (2013.01)

(58) Field of Classification Search
CPC . A63B 43/002; A63B 2243/007; A63B 43/00; A63B 2225/01; A63B 37/0074; A63B 37/08; A63B 2243/0025; A01K 15/025; A63H 27/005
See application file for complete search history.

(56) References Cited

U.S. PATENT DOCUMENTS

| | | | | |
|---|---|---|---|---|
| 3,256,020 | A | * | 6/1966 | Smith .................. A63B 43/002 446/225 |
| 5,284,341 | A | * | 2/1994 | Routzong .............. A63B 43/00 446/120 |
| 5,460,368 | A | * | 10/1995 | Pearson ............... A63B 43/002 473/597 |
| 5,676,611 | A | * | 10/1997 | Foster .................. A63B 43/002 473/613 |
| 7,363,880 | B2 | | 4/2008 | Ritchey et al. |
| 7,833,079 | B2 | | 11/2010 | Willinger et al. |
| 8,978,590 | B2 | | 3/2015 | Nunn et al. |
| 9,078,415 | B2 | | 7/2015 | Axelrod et al. |

(Continued)

OTHER PUBLICATIONS

International Search Report issued Jun. 6, 2022 in corresponding International Application No. PCT/US2022/021367.

(Continued)

*Primary Examiner* — Peter M Poon
*Assistant Examiner* — Jeffrey R Larsen
(74) *Attorney, Agent, or Firm* — Foley & Lardner LLP (57) ABSTRACT

A pet toy includes a core body and a coating layer. The core body is made of a first material. The core body includes a first core body member and a second core body member that are mated together to have a space therebetween. The coating layer covers the core body. The coating layer is made of a second material that is different from the first material.

20 Claims, 13 Drawing Sheets

(56) References Cited

U.S. PATENT DOCUMENTS

| | | |
|---|---|---|
| D821,662 S | 6/2018 | Wills et al. |
| 2001/0039221 A1* | 11/2001 | Schneider ............... A63B 43/06 |
| | | 473/614 |
| 2013/0139797 A1* | 6/2013 | Oblack ................ A01K 15/025 |
| | | 473/607 |
| 2017/0182512 A1* | 6/2017 | Swift ...................... B60R 13/08 |
| 2020/0288671 A1 | 9/2020 | Nguyen et al. |
| 2020/0306621 A1* | 10/2020 | Bernal ...................... F42B 6/00 |

OTHER PUBLICATIONS

Written Opinion issued Jun. 6, 2022 in corresponding International Application No. PCT/US2022/021367.

* cited by examiner

PET TOY

CROSS-REFERENCE TO RELATED APPLICATIONS

This application claims priority to Provisional U.S. Patent Application No. 63/164,021, filed on Mar. 22, 2021. The entire disclosure of Provisional U.S. Patent Application No. 63/164,021 is hereby incorporated herein by reference.

BACKGROUND

Field of the Invention

The present invention generally relates to a pet toy. More specifically, the present invention relates to a pet toy made of different materials such that it is durable, yet soft and light.

Background Information

Conventional large pet toys that are designed to be lightweight are typically made out of hard plastic or are formed by methods such as blow molding or roto-molding components together. Further, typical throw toys require the user to pick up the toy in order to launch the pet toy into the air so that the pet can chase after the pet toy.

SUMMARY

In view of the state of the known technology, it has been determined that an improved pet toy is desired. A first aspect of the present disclosure is to provide a pet toy comprising a core body and a coating layer. The core body is made of a first material. The core body includes a first core body member and a second core body member that are mated together to have a space therebetween. The coating layer covers the core body. The coating layer is made of a second material that is different from the first material.

In a second aspect of the pet toy in accordance with the first aspect, the first material has a first density. The coating layer has a second density that is greater than the first density.

In a third aspect of the pet toy in accordance with the first aspect, the first material includes polyurethane foam.

In a fourth aspect of the pet toy in accordance with the third aspect, the second material includes liquid rubber that is applied and cured to the first material.

In a fifth aspect of the pet toy in accordance with the fourth aspect, the first core body member is a first polyurethane foam. The second core body member is a second polyurethane foam that are mated together.

In a sixth aspect of the pet toy in accordance with the fifth aspect, the pet toy further comprises a cavity defining the space separating a portion of the first polyurethane foam and a portion of the second polyurethane foam.

A seventh aspect of the present disclosure is to provide a pet toy comprising a spheroid portion and a foot portion. The foot portion is integrally attached to the spheroid portion. The foot portion has a flat surface that forms a stand for the spheroid portion.

In an eighth aspect of the pet toy in accordance with the seventh aspect, the spheroid portion includes a first polyurethane foam and a second polyurethane foam that are mated together.

In a ninth aspect of the pet toy in accordance with the eighth aspect, the foot portion includes the first and second polyurethane foam.

In a tenth aspect of the pet toy in accordance with the eighth aspect, the pet toy further comprises a space separating a portion of the first polyurethane foam and a portion of the second polyurethane foam in the spheroid portion.

In an eleventh aspect of the pet toy in accordance with the tenth aspect, the foot portion has a first density of the pet toy. The spheroid portion has a second density of the pet toy. The first density is greater than the second density.

In a twelfth aspect of the pet toy in accordance with the eleventh aspect, the pet toy further comprises a coating layer covering the spheroid portion and the foot portion.

In a thirteenth aspect of the pet toy in accordance with the twelfth aspect, the coating layer includes liquid rubber that is applied and cured to the spheroid portion and the foot portion.

A fourteenth aspect of the present disclosure is to provide a method of manufacturing a pet toy. The method comprises bonding a first polyurethane foam to a second polyurethane foam to form a core body of the pet toy. The method further comprises coating a rubber coating layer over an exterior surface of the core body. The method further comprises curing the rubber coating layer.

In view of the state of the known technology, another aspect of the present disclosure is to provide a pet toy comprising a spheroid portion and a foot portion. The foot portion is integrally attached to the spheroid portion. The foot portion has a flat surface that forms a stand for the spheroid portion.

In view of the state of the known technology, another aspect of the present disclosure is to provide a method of manufacturing a pet toy. The method comprises mating a first polyurethane foam to a second polyurethane foam to form a core body of the pet toy having a cavity therebetween. The method further comprises coating a rubber coating layer over an exterior surface of the core body. The method further comprises curing the rubber coating layer over the core body.

The pet toy of the present disclosure provides an improved pet toy that is durable, yet soft and light. Further, the pet toy of the present disclosure is configured to enable the user to position the pet toy in an upright position without the use of hands, e.g., by using the user's foot instead. Thus, the user can avoid touching the pet toy with their hands when the pet toy has slobber or other materials on the surface thereof.

Also other objects, features, aspects and advantages of the disclosed pet toy will become apparent to those skilled in the art from the following detailed description, which, taken in conjunction with the annexed drawings, discloses one embodiment of the pet toy.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring to FIGS. 1 to 7 and 14 to 18, a pet toy 10 is illustrated in accordance with an embodiment. As best seen in FIGS. 14 to 18, the pet toy 10 comprises a core body 12 and a coating layer 14. The core body 12 comprises a spheroid portion 16 and a foot (or feet) portion, as best seen in FIGS. 1 to 7. Specifically, the spheroid portion 16 of the core body 12 has a prolate spheroidal shape with a pointy tip and a polar radius that is greater than an equatorial radius. In the illustrated embodiment, the coating layer 14 covers the core body 12. That is, the coating layer 14 covers both the spheroid portion 16 and the foot portion 18, as seen in FIGS. 14 to 18. Therefore, in the illustrated embodiment, the core body 12 can be considered a substrate for the coating layer 14 as will be further explained below.

Figure 1:
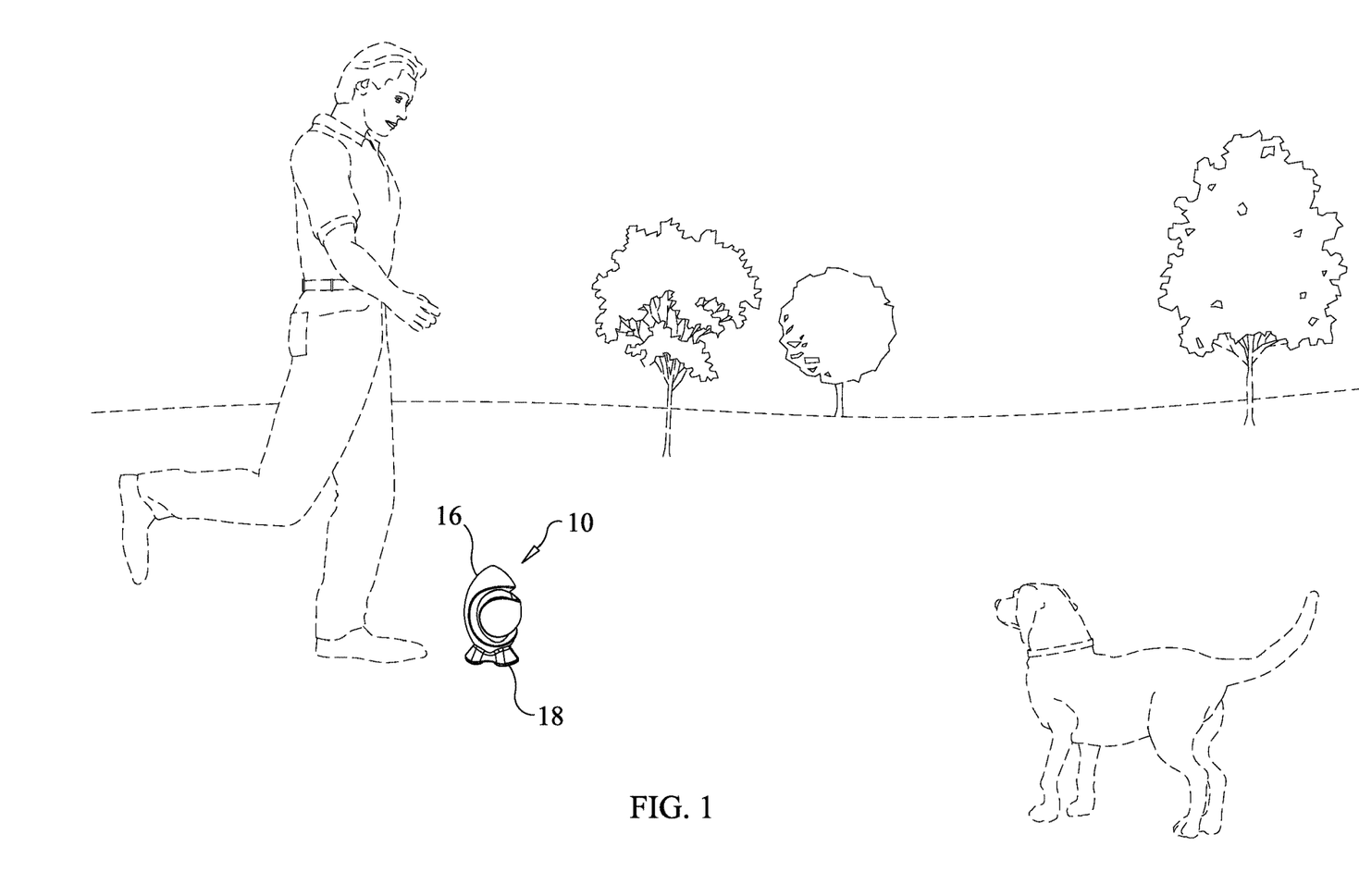
FIG. 1 is a plan view of a pet toy in a user environment in accordance with an illustrated embodiment.
Figure 2:
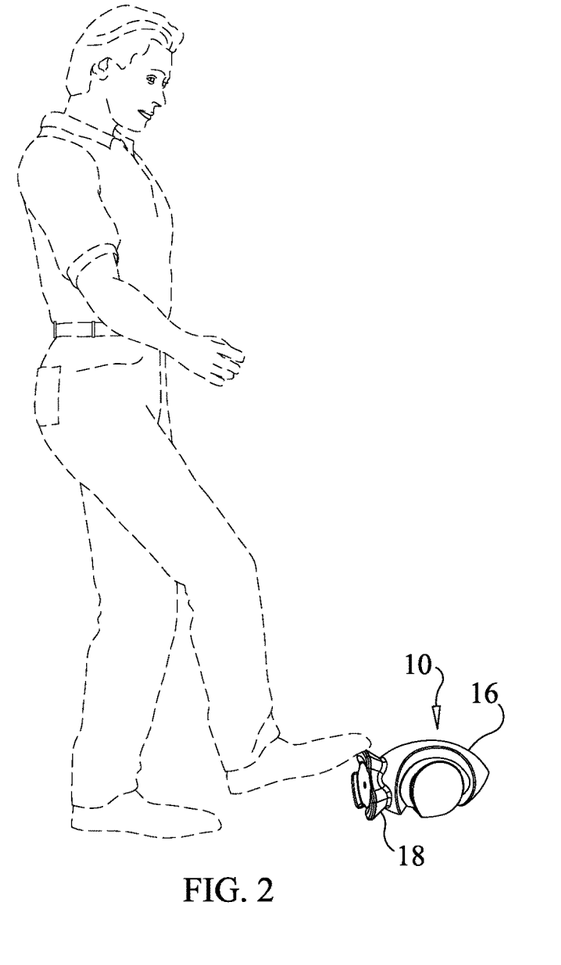
FIG. 2 is a view of the pet toy of FIG. 1 being operated by the user.
Figure 3:
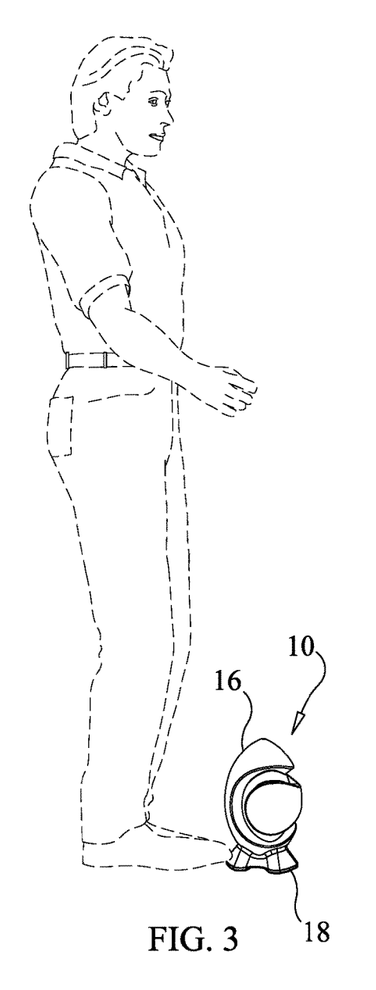
FIG. 3 is a view of the pet toy of FIGS. 1 and 2 in an upright state.
Figure 4:
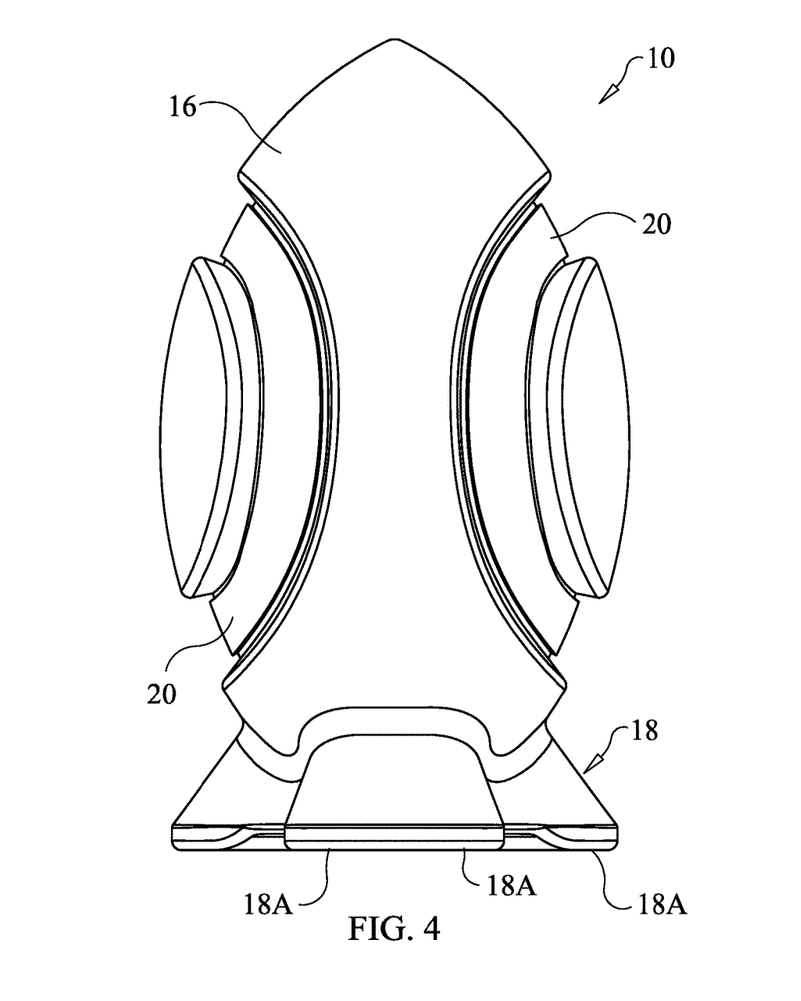
FIG. 4 is a side elevational view showing a first side of the pet toy.
Figure 5:
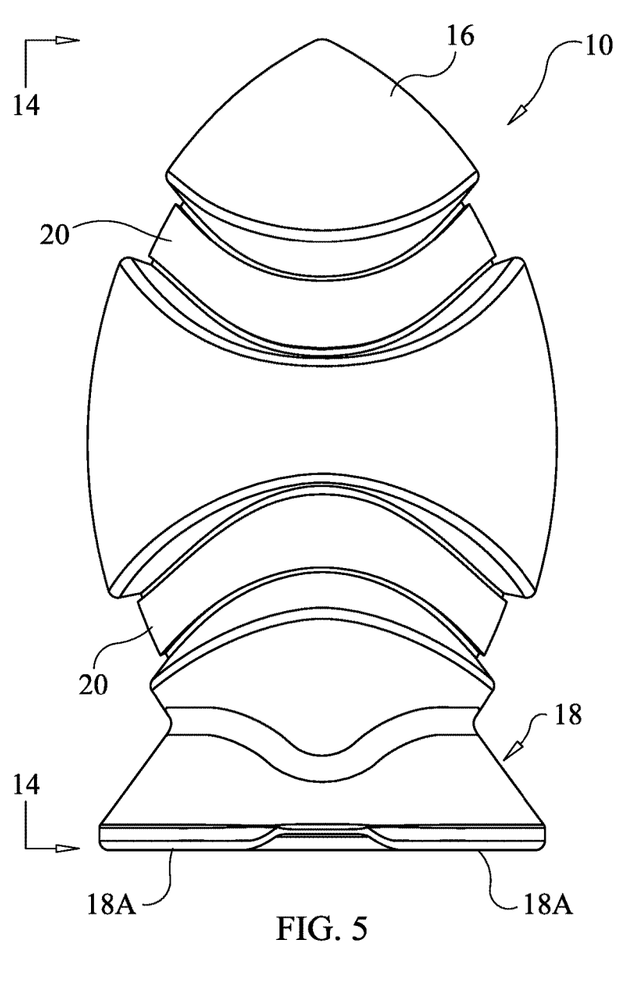
FIG. 5 is a side elevational view showing a second side the pet toy.
Figure 6:
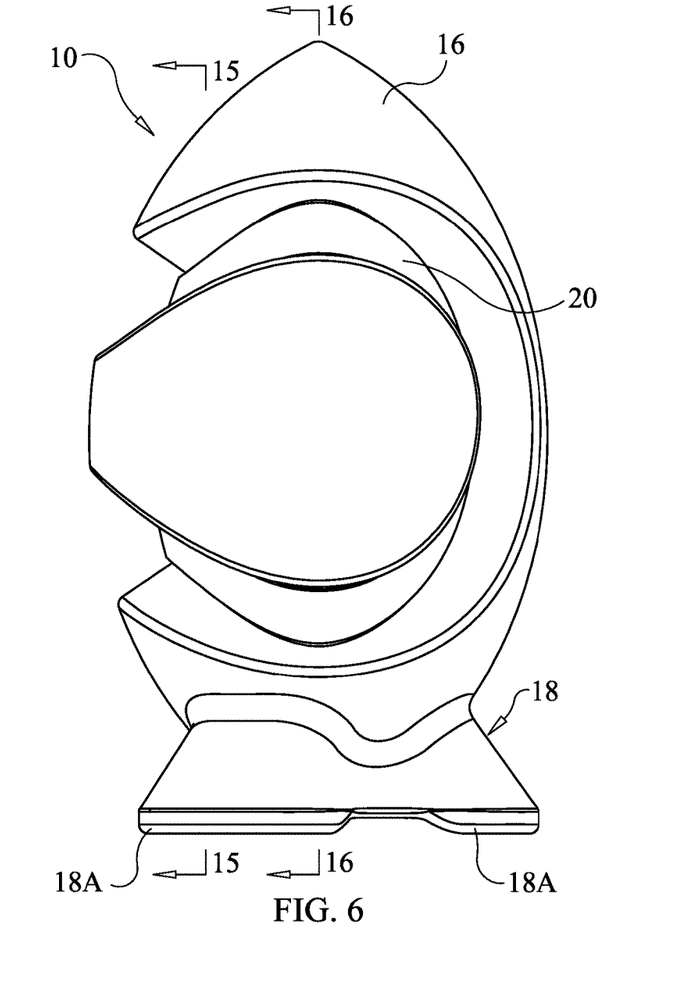
FIG. 6 is a side elevational view showing a third side of the pet toy.
Figure 7:
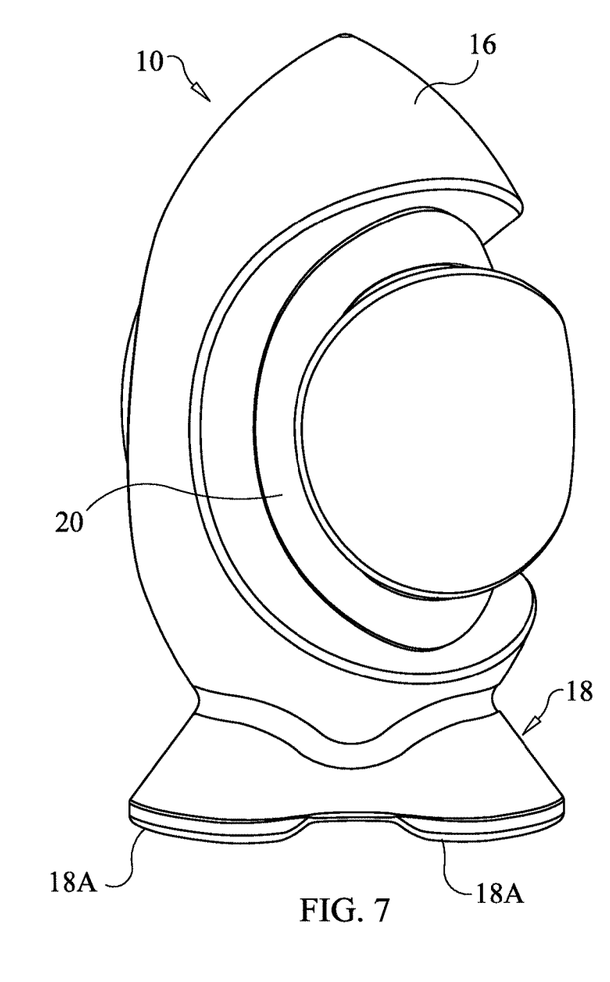
FIG. 7 is a side elevational view showing a fourth side of the pet toy.
Figure 8:
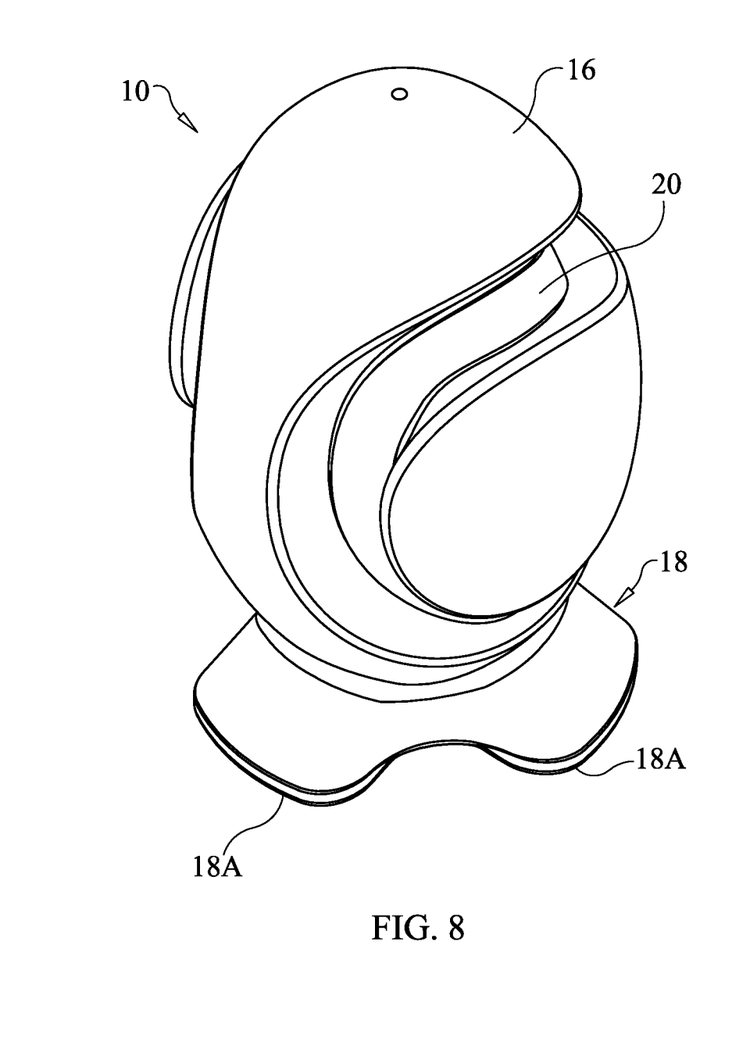
FIG. 8 is a top perspective view of the pet toy.
Figure 9:
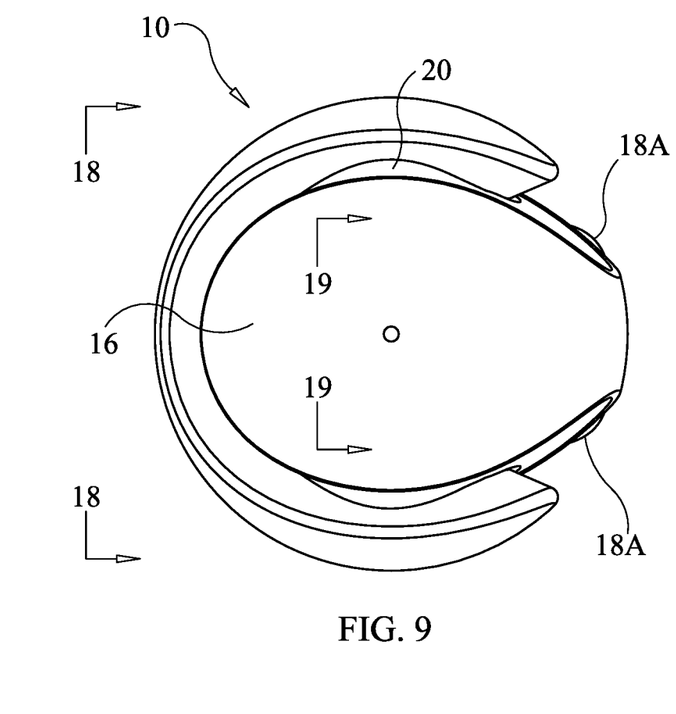
FIG. 9 is a top plan view of the pet toy.
Figure 10:
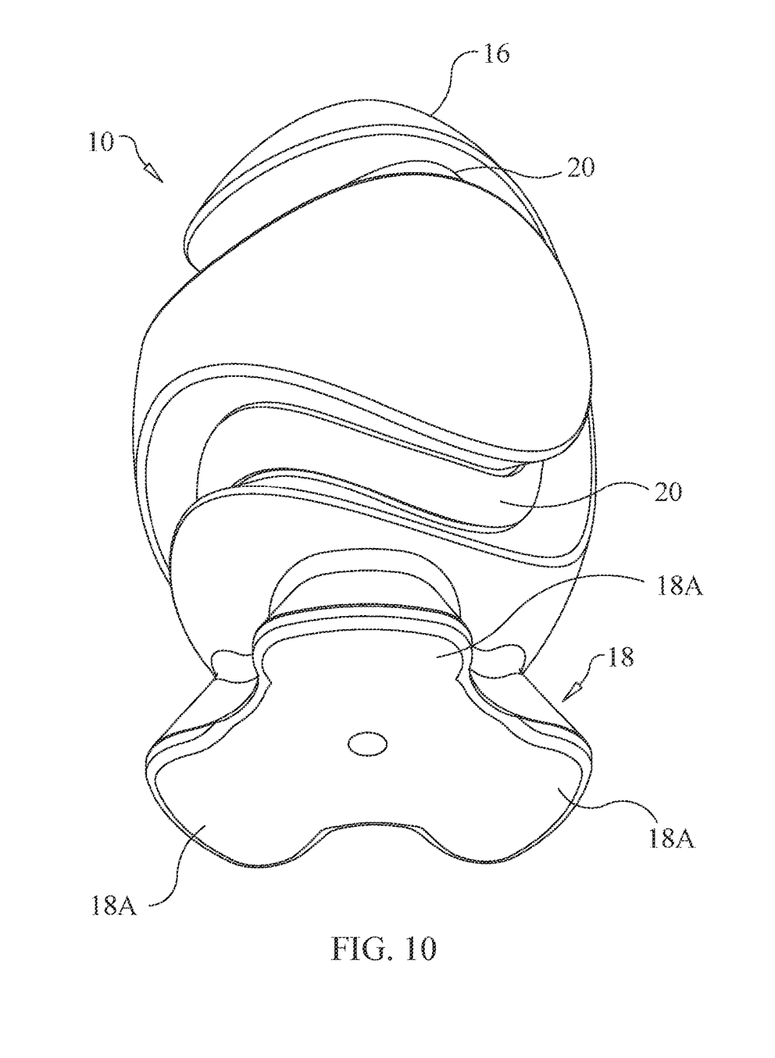
FIG. 10 is a bottom perspective view of the pet toy.

In the illustrated embodiment, the pet toy 10 has an outer surface with an overall shape that is similar to that of an American football (i.e., a prolate spheroid). As can be understood, similar to an American football "kickoff", the pet toy 10 is designed to be kicked by the user to induce the pet to chase after the toy so that the user does not need to pick up the pet toy 10, as shown in FIGS. 1 to 3. The outer surface of the spheroid portion 16 preferably includes one or more outer groove(s) 20 to enhance aerodynamic performance of the pet toy 10, as best seen in FIGS. 4 to 10. The groove(s) 20 also reduces weight while maintaining the spheroidal shape of the pet toy 10. The groove(s) 20 can also help a user or a pet to pick up the pet toy 10, by providing an area for fingers or teeth to grip. In the illustrated embodiment, the groove(s) 20 forms a single continuous channel along an exterior (the outer surface) of the spheroid portion 16 that meanders around the outer surface with an overall serpentine-like shape. However, it will be apparent to those skilled in the pet products field from this disclosure that the pet toy 10 can include additional grooves of different shapes and designs.

In the illustrated embodiment, the pet toy 10 preferably has a first primary color (e.g., orange) that is applied to a majority of the pet toy 10, and a second color that is applied to the groove. That is, the pet toy 10 has the first primary color except for the groove 20 which has the second primary color (e.g., blue).

As best seen in FIGS. 4 to 13, the foot portion 18 is integrally formed with the spheroid portion 16. The foot portion 18 has a flat surface that forms a stand for the pet toy 10 (see for example, FIGS. 10 to 13). That is, the foot portion 18 is considered to be a stand or a base for the spheroid portion 16 so that the spheroid portion 16 is capable of standing upright. Therefore, the spheroid portion 16 can stand upright as supported on the foot portion 18 so that the pet toy 10 can stand upright without being supported by a user or other device. In other words, the foot portion 18 can act as an integral tee to position the spheroid portion 16 in an upright manner for kicking. As can be understood, the integral tee enables a user to kick the pet toy 10 in a similar manner to an American football "kickoff".

As seen in FIGS. 2 and 3, the user can use a foot or feet to move the pet toy 10 into the upright position. That is, the pet toy 10 is configured and designed such that the user does not need to use hands to set the pet toy 10 to stand upright. The user can then kick the pet toy 10 like a football so that the pet toy 10 is a chase toy for the pet to pursue. Therefore, the user can launch the pet toy 10 without having to touch the pet toy 10 with his hands.

Figure 11:
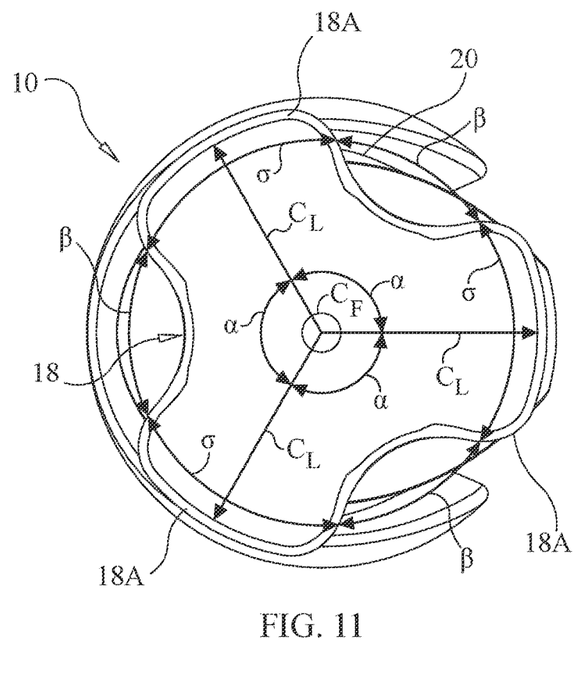
FIG. 11 is a bottom plan view of the pet toy.
Figure 12:
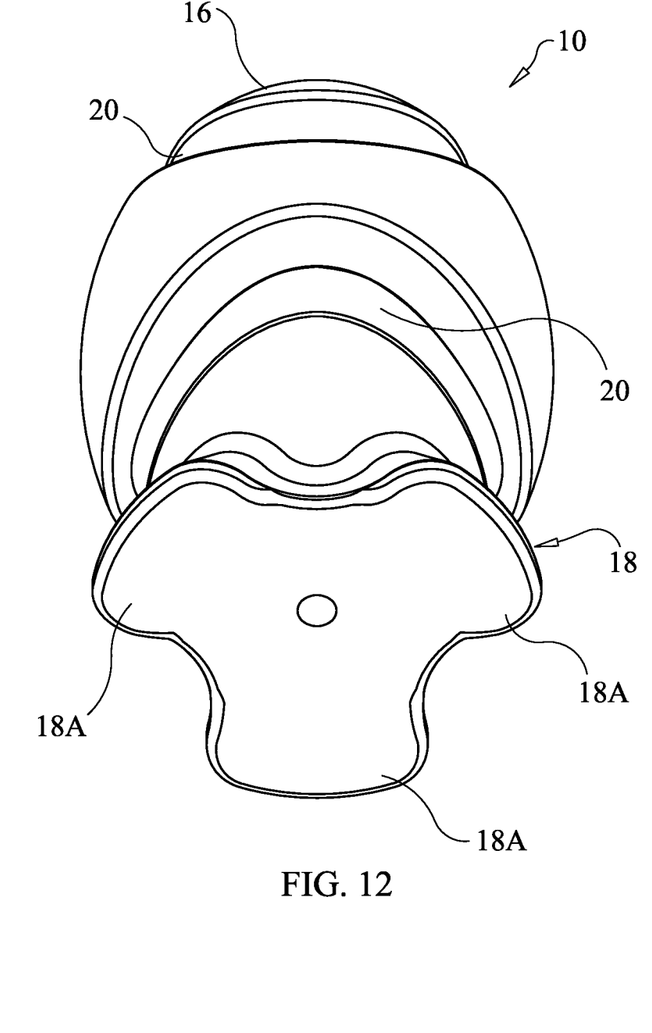
FIG. 12 is another bottom perspective view of the pet toy.
Figure 13:
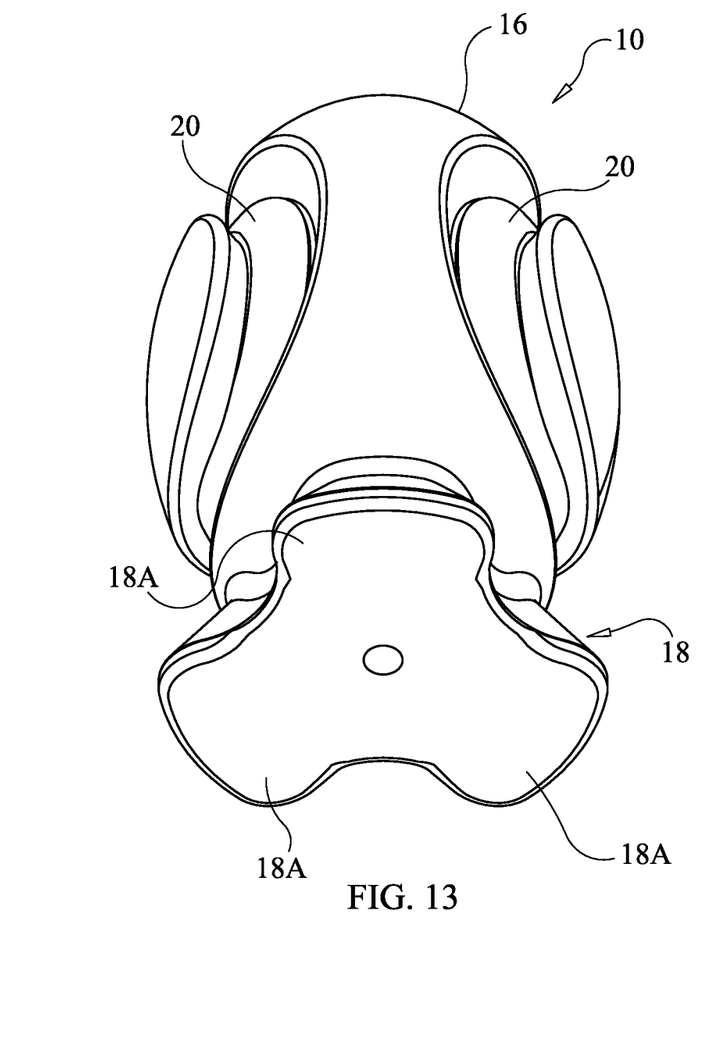
FIG. 13 is another bottom perspective view of the pet toy.
Figure 14:
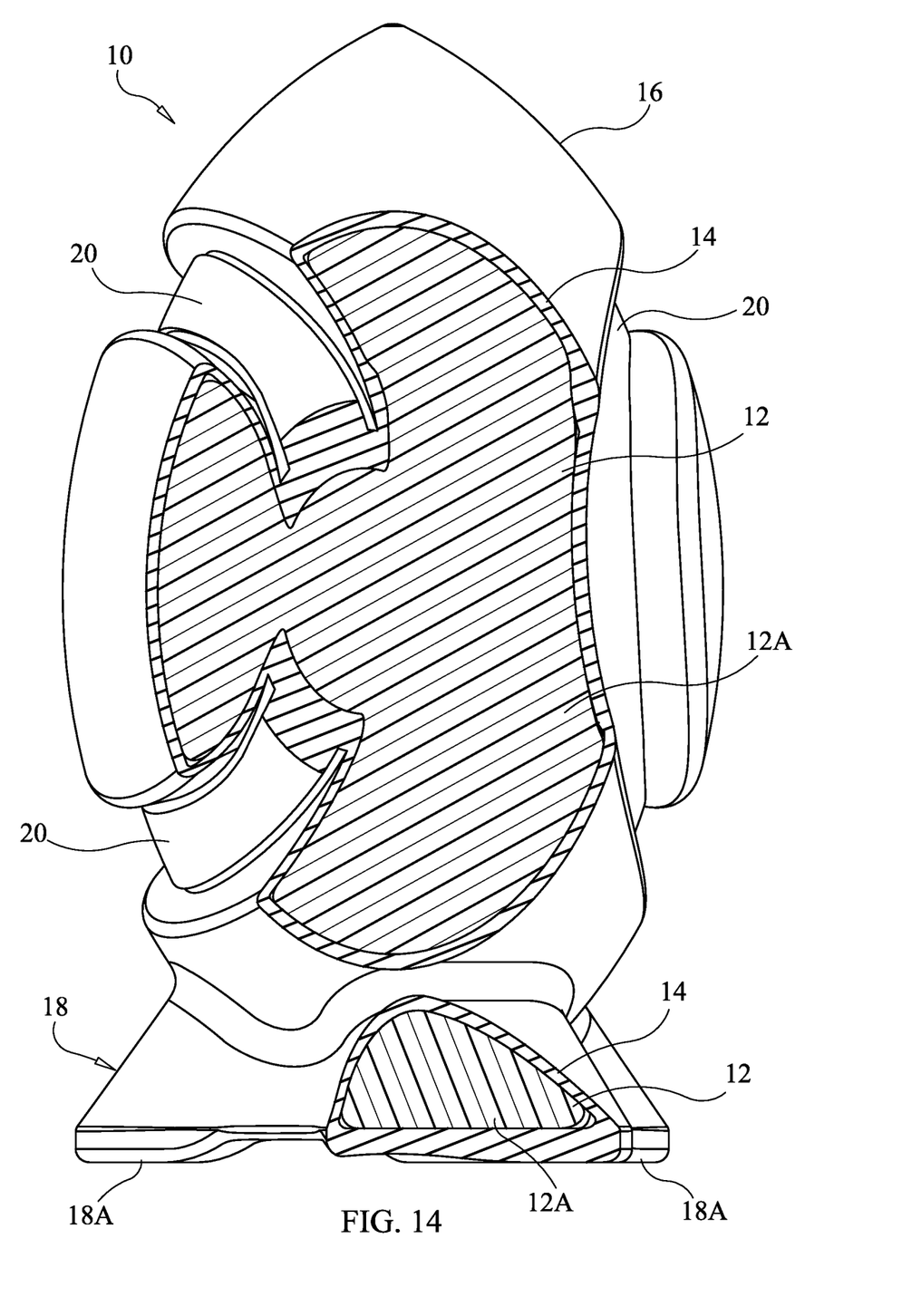
FIG. 14 is a cross-sectional view of the pet toy taken along and in the direction of lines 14-14 of FIG. 5.

In one embodiment, the movement of the pet toy 10 into the upright position can be accomplished since the pet toy 10 has a plurality of fins 18A that are opposed to each other. For example, as best seen in FIGS. 11 to 13, the foot portion 18 includes three fins 18A (or feet) extending from the spheroid portion 16. That is, the foot portion 18 is a tripod stand that provides a balanced and strong base for the spheroid portion 16 to rest on in the upright position. The tripod base design of the foot portion 18 enables at least two contact points at the foot portion 18 with the ground at all times. That is, at least two fins 18A will always make contact with the ground when setting the pet toy 10 into the upright position. The foot portion 18 is also designed for the user to contact or grab while a pet is holding the spheroid portion 16. Therefore, the pet toy 10 is designed to be anti-slobber because the user can hold the foot portion 18 and/or the groove 20 of the spheroid portion 16. It will be apparent to those skilled in the pet products field from this disclosure that the foot portion 18 can include different numbers of fins 18A having varying shapes and sizes to form the stand of the pet toy 10.

In this embodiment, the foot portion 18 has a center $C_F$. Center-lines $C_L$ of the fins 18A extending radially outward from the center $C_F$ are spaced apart from one another by an angle $\alpha$ that is approximately 120 degrees to form the tripod stand. Each fin 18A is spaced apart from the adjacent fin 18a as measured in an annular direction where the annular direction is centered about the center $C_F$. Each fin 18A is further spaced apart from the adjacent fin 18a in the annular direction by an angle $\beta$. Each fin 18A has an annular width corresponding to the angle $\sigma$ whose center is also the center $C_F$. As shown in FIG. 11, the angle $\sigma$ is greater that the angle $\beta$. In other words each fin 18A has an annular width that is greater than the annular distance between adjacent ones of the fins 18A. Thus, when the pet toy is lying on the ground, as shown in FIG. 2, two of the three fins 18A contact the ground and a third fin 18A extends in an upward position. As shown in FIG. 3, this upward position of one of the fins 18A enables the user to easily locate and step on the upright fin 18A to right the pet toy 10 into a kicking position. In other words, the upright fin 18A can act as a lever to rotate the pet toy 10 around the two fins 18A contacting the ground to easily right the pet toy 10. This configuration of the three fins 18A enables the user to easily right the pet toy without touching the pet toy 10 (which may have slobber thereon) and without the need to bend over to grab the pet toy 10. Thus, the pet toy 10 is significantly improved relative to a conventional pet toy, and can prolong enjoyment by the user and the pet while reducing possible fatigue by the user.

In the illustrated embodiment, the core body 12 of the pet toy 10 is made of a first material. In this embodiment, the first material includes polyurethane foam. More preferably, the first material is polyurethane foam. In this embodiment, the coating layer 14 is made of a second material that is different from the first material, as will be further described below.

Referring to FIGS. 15, 16, 18 and 19, the core body 12 includes a first polyurethane foam 12A and a second polyurethane foam 12B that are bonded together. For example, the first and second polyurethane foams 12A and 12B can be fitted to each other by protrusions and corresponding receiving openings and/or channels, as seen in FIGS. 12 and 13. The first and second polyurethane foams 12A and 12B can be held together by adhesive. Therefore, the first and second polyurethane foams 12A and 12B are mated together to form the core body 12. As shown, the foot portion 18 also includes the first and second polyurethane foams 12A and 12B. Therefore, the first and second polyurethane foams 12A and 12B are mated together to form the foot portion 18.

As best seen in FIGS. 15 to 18, the core body 12 comprises a cavity 22 separating a portion of the first polyurethane foam 12A and a portion of the second polyurethane foam 12B in the spheroid portion 16. That is, the cavity 22 separates the first and second polyurethane foams 12A and 12B in the spheroid portion 16 to reduce weight. The first polyurethane foam 12A is formed having a first concavity 22A. The second polyurethane foam 12B is formed having a second concavity 22B that mates with or is coupled to the first concavity 22A to form the cavity 22. The pet toy 10 having the cavity 22 creates a pet toy 10 that is lightweight, since a significant portion of the interior volume lacks material.

The pet toy 10 preferably has a total volume of approximately 1.5 liters. The cavity 22 of the pet toy 10 preferably has a volume of 0.385 liters. That is, the pet toy 10 preferably has an empty volume of approximately 0.385 liters. Therefore, the combined volume of the coating layer 14 and the first and second polyurethane foams 12A and 12B is preferably 1.147 liters. That is, the combined volume first and second materials of the pet toy 10 is approximately 1.147 liters. It has been found that the ratio the volume of the cavity 22 to the overall volume of the pet toy 10 results in a pet toy 10 that maintains an overall structural rigidity that enables the pet toy 10 to be kicked by a user or bitten by a pet without permanently deforming, while simultaneously reducing the weight of the pet toy 10. It will be apparent to those skilled in the pet products field from this disclosure that the volume values of these components can vary while maintaining a desired ratio of the different volume values with respect to each other.

Figure 15:
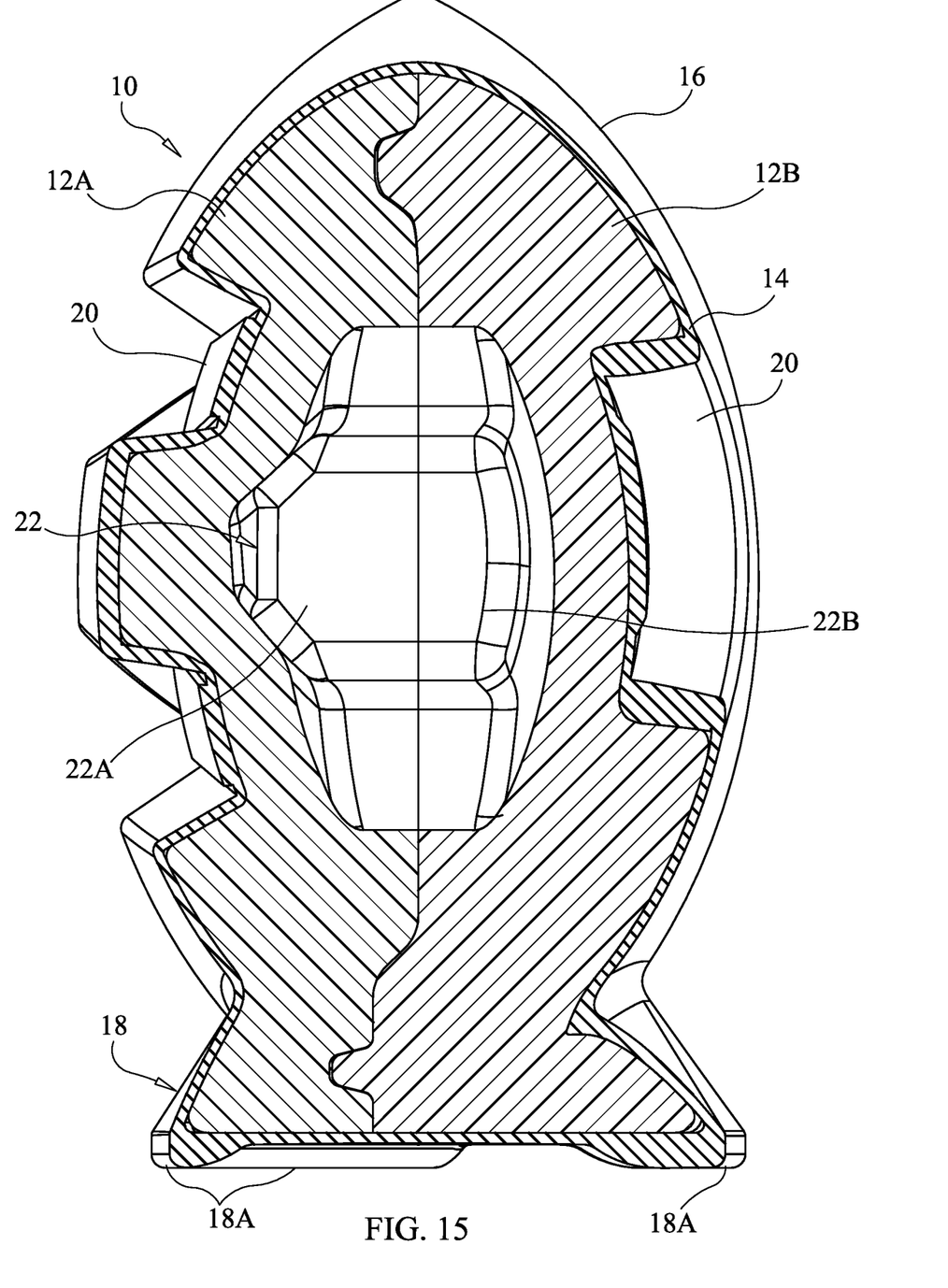
FIG. 15 is a cross-sectional view of the pet toy taken along and in the direction of lines 15-15 of FIG. 6.
Figure 16:
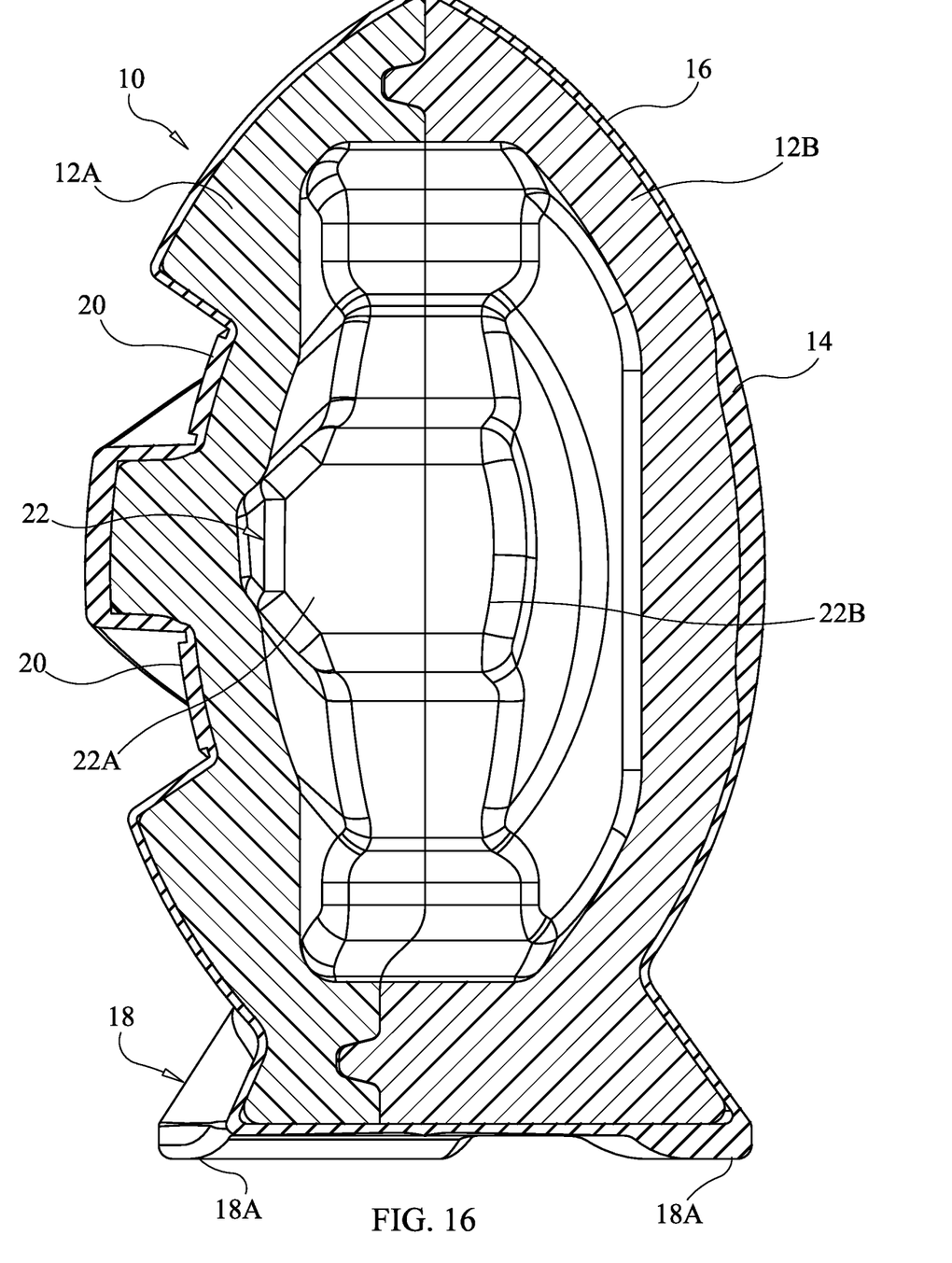
FIG. 16 is a cross-sectional view of the pet toy taken along and in the direction of lines 16-16 of FIG. 6.
Figure 17:
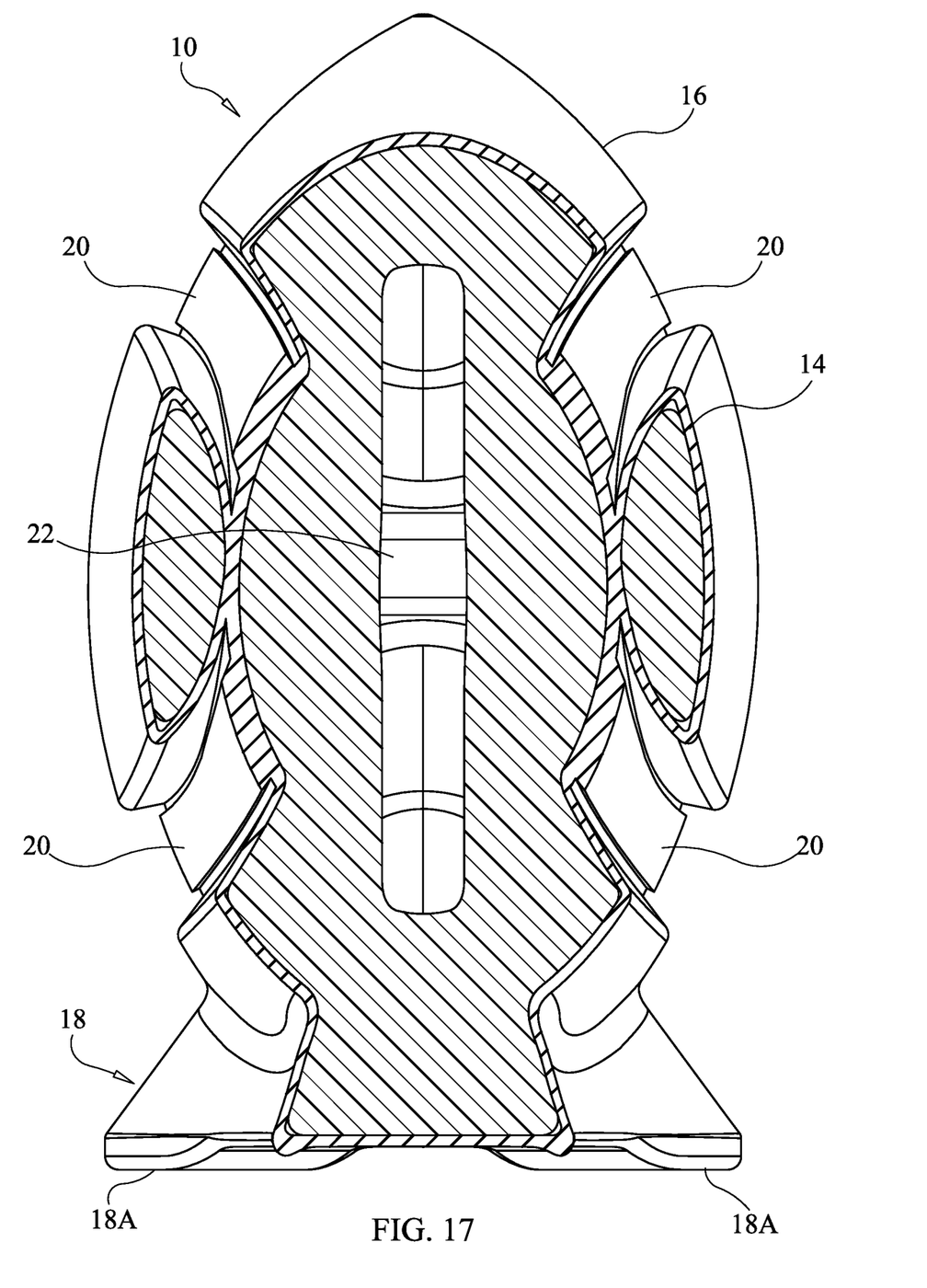
FIG. 17 is a cross-sectional view of the pet toy taken along and in the direction of lines 17-17 of FIG. 4.
Figure 18:
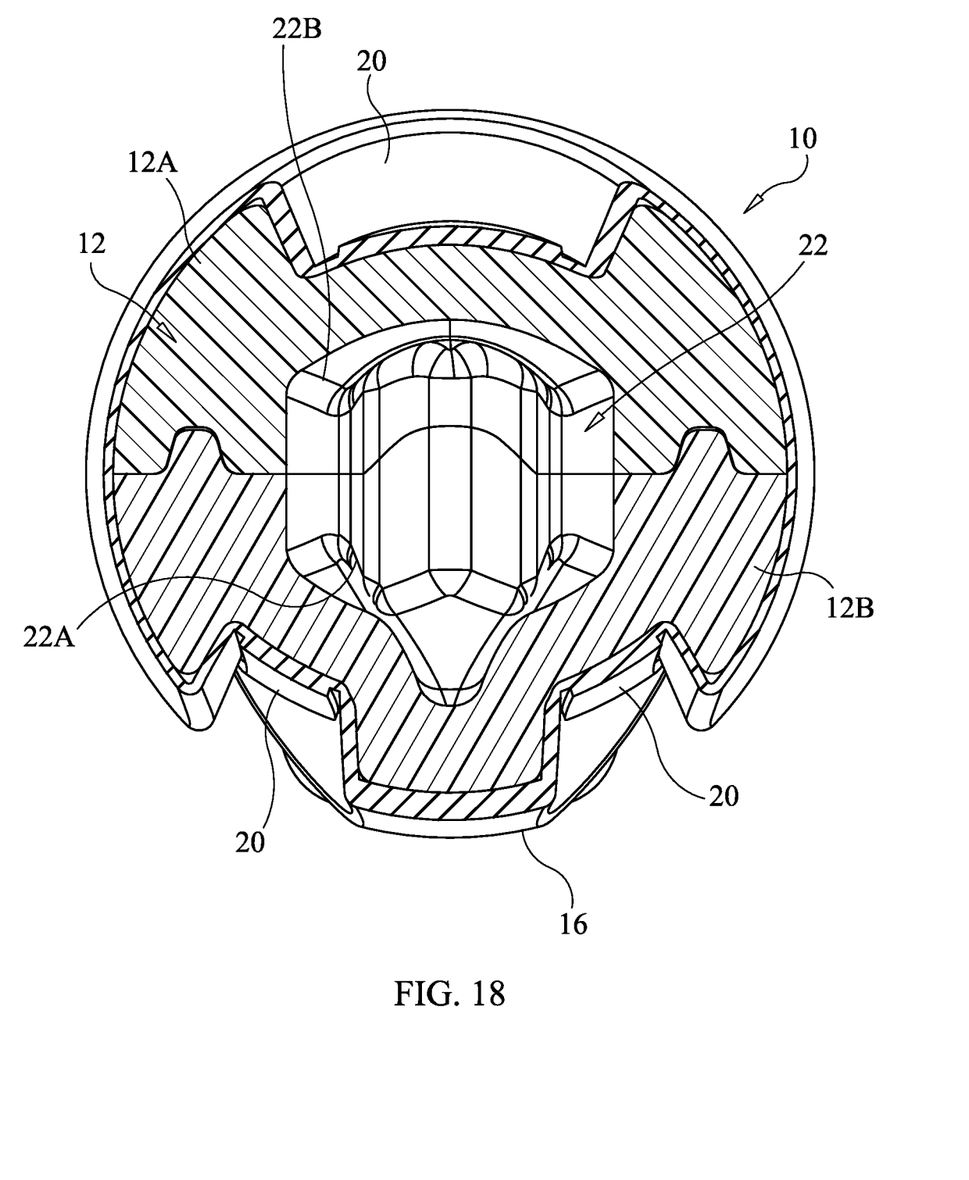
FIG. 18 is a cross-sectional view of the pet toy taken along and in the direction of lines 18-18 of FIG. 9.
Figure 19:
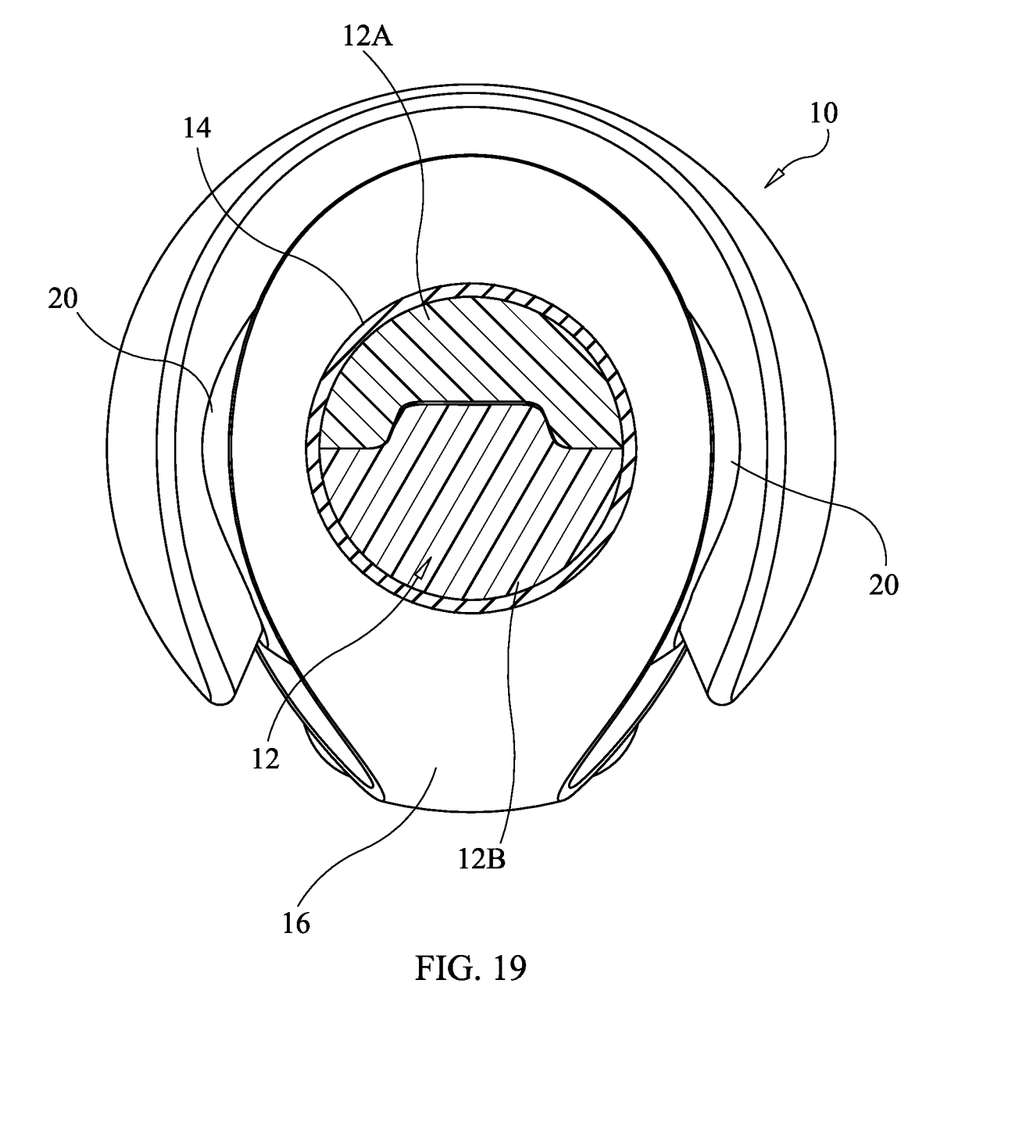
FIG. 19 is a cross-sectional view of the pet toy taken along and in the direction of lines 19-19 of FIG. 9.

As shown in FIGS. 15 and 16, the foot portion 18 is devoid of the cavity 22 that separates the first and second polyurethane foams 12A and 12B. Therefore, the first and second polyurethane foams 12A and 12B contact each other continuously through the foot portion 18 but not through the core body 12. In this way, the foot portion 18 has a first density of the pet toy 10 and the spheroid portion 16 has a second density of the pet toy 10. In the illustrated embodiment, the first density is greater than the second density. That is, the foot portion 18 is denser than the core body 12 of the pet toy 10.

In the illustrated embodiment, the pet toy 10 can have an overall density similar to that of a football. For example, the pet toy 10 can have an overall density of 0.1 g/cm$^3$ considering an approximate weight of about 410 to 460 grams and an approximate density of air is 1.2 kg/m3. In the illustrated embodiment, the first and second polyurethane foams 12A and 12B preferably together have a combined weight of approximately 190 grams. In the illustrated embodiment, the coating layer 14 preferably has a total weight of approximately 210 grams. Therefore, the second material preferably weighs more than the first material in the illustrated embodiment.

In the illustrated embodiment, the preferred density ratio of the first material to the second ratio is 0.2 to 1.2. That is, the preferred density of the first and second polyurethane foams 12A and 12B together is preferably approximately 0.2. The preferred density of the coating layer 14 is preferably approximately 1.2 g/cm$^3$. It will be apparent to those skilled in the pet products field from this disclosure that the density values of these components can vary while maintaining a desired ratio of the different density values with respect to each other.

In the illustrated embodiment, the first and second polyurethane foams 12A and 12B can be a sprayed polyurethane foam having a closed cell structure and is water resistant. The first and second polyurethane foams 12A and 12B can alternatively include foam rubber made using small amounts of blowing agents to produce a less dense foam structure with better cushioning and energy absorption or thermal insulation.

The first and second polyurethane foams 12A and 12B can be made more flexible for energy absorption, or more rigid such as having polyisocyanurate (polyiso) foams as needed and/or desired. Preferably, the first and second polyurethane foams 12A and 12B are made to be flexible, deformable and lightweight. Additionally, the first and second polyurethane foams 12A and 12B can be made of thermoplastic polyurethane (TPU) that is highly elastic, flexible and resistant to abrasion, impact and weather. The first and second polyurethane foams 12A and 12B can be formed by extrusion, injection molding (e.g., reaction injection molding), blow and/or compression molding.

The core body 12 preferably has a surface that is textured to help catch the coating layer 14 or enable a secure attachment between the core body 12 and the coating layer 14. That is, the first and second polyurethane foams 12A and 12B preferably have micro dimples (not shown) that can receive the material of the coating layer 14. However, the core body 12 is preferably smooth to the naked eye.

As stated, the coating layer 14 includes the second material that is applied to the core body 12. In the illustrated embodiment, the second material includes liquid rubber that is applied and cured to the first and second polyurethane foams 12A and 12B. That is, the coating layer 14 includes liquid rubber that is applied and cured to the spheroid portion 16 and the foot portion 18. The second material is bonded to the first material inside a mold with appropriate heat and pressure using a compression molded machine. In this way, the coating layer 14 is applied to the first and second polyurethane foams 12A and 12B. In the illustrated embodiment, the second material comprises the coating material 14.

The second material can include elastic coatings that can protect the first and second polyurethane foams 12A and 12B from surface degradation, inhibit moisture vapor transmission, enhance aesthetics and to increase the impact and abrasion resistance of the pet toy 10. The second material can be an above-grade exterior coating that is thicker than paint that is also a flexible coating that helps waterproof the exterior of the pet toy 10. When the liquid rubber of the second material is applied to the core boy, the coating layer 14 is formed, is cured, dried, hardened and bonded to the core body 12, while remaining flexibility so that the pet toy 10 has a durable and a deformable structure that can retain its shape and consistency through multiple uses.

Examples of the second material that can form the coating layer 14 include elastic coatings such as acrylic, butyl rubber, chlorosulfonated polyethylene rubbers, polychloroprene rubbers, silicone polymer elastomeric coatings, polyurethane elastomer, modified asphalt, etc. In the illustrated embodiment, the first material has a first density, and the coating layer 14 has a second density that is greater than the first density. That is, the coating layer 14 can be denser than the core body 12 in the illustrated embodiment.

In the illustrated embodiment, the pet toy 10 is manufactured by a method comprising forming the first polyurethane foam 12A and the second polyurethane foam 12B. In particular, the method can comprise forming the first polyurethane foam 12A using a chemical foaming process inside an appropriate mold using an injection molding machine. The second polyurethane foam 12B can also be formed using a similar chemical foaming process inside another appropriate molding using the injection molding machine. As stated, the first polyurethane foam 12A and the second polyurethane foam 12B can alternatively be formed by extrusion, injection molding (e.g., reaction injection molding), blow and/or compression molding.

The method further comprises forming the coating layer 14 (e.g., the second material) by compression molding the rubber skin of the coating layer 14 inside a mold using a rubber molding machine. The method further comprises bonding or mating the first polyurethane foam 12A to the second polyurethane foam 12B to form the core body 12 of the pet toy 10. The method further comprises applying a rubber coating layer 14 over an exterior surface of the core body 12. Therefore, the method further comprises bonding the coating layer 14 to the first and second polyurethane foams 12A and 12B inside a mold with heat and pressure using a compression molding machine. The method further comprises curing the rubber coating layer 14 over the core body 12.

The pet toy of the present disclosure provides an improved pet toy that is durable, yet soft and light. Further, the pet toy of the present disclosure enables the user to position the pet toy in an upright position without the use of hands, e.g., by using a foot. Thus, the user avoids touching the pet toy with their hands when the pet toy has slobber or other materials on the surface thereof.

GENERAL INTERPRETATION OF TERMS

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pet toy comprising:
    a core body that is made of a first material, the core body including a first core body member and a second core body member that are mated together to have a space therebetween, an outer surface of the core body having a football-like shape, the outer surface defining a channel having a serpentine-like shape;
    a foot portion integrally attached to the core body, the foot portion having fins opposed each other and a flat bottom surface such that the fins form a stand for the core body, the fins extending farther from the core body than the flat bottom surface, the fins configured to contact a support surface, the flat bottom surface offset from the support surface, the foot portion being configured and dimensioned to enable a user's foot pressing on the foot portion to position the pet toy from a non-upright position to an upright position without the use of hands; and
    a coating layer covering the core body, the coating layer being made of a second material that is different from the first material.

2. The pet toy in accordance with claim 1, wherein the first material has a first density, and the coating layer has a second density that is greater than the first density.

3. The pet toy in accordance with claim 1, wherein the first material includes polyurethane foam.

4. The pet toy in accordance with claim 3, wherein the second material includes liquid rubber that is applied and cured to the first material.

5. The pet toy in accordance with claim 4, wherein
the first core body member is a first polyurethane foam and the second core body member is a second polyurethane foam that are mated together.

6. The pet toy in accordance with claim 5, further comprising
a cavity defining the space separating a portion of the first polyurethane foam and a portion of the second polyurethane foam.

7. The pet toy of claim 1, wherein the flat bottom surface forms a substantially circular area between the fins.

8. The pet toy of claim 1, wherein the fins comprise:
a first fin integrally formed with the core body;
a second fin integrally formed with the core body; and
a third fin integrally formed with the core body.

9. A pet toy comprising:
a spheroid portion having an outer surface and a cavity, the outer surface defining a channel having a serpentine-like shape; and
a foot portion that is integrally attached to the spheroid portion, the foot portion having a flat bottom surface and a plurality of fins, the foot portion forming a stand for the spheroid portion, the plurality of fins each extending radially outward from a center of the foot portion with radially extending center lines of each of the fins being angularly spaced apart from one another by approximately 120 degrees, each fin having an angular annular width that is greater than an angular annular distance between adjacent fins as measured at the flat bottom surface of the foot portion, the fins extending farther from the spheroid portion than the flat bottom surface, the fins configured to contact a support surface, the flat bottom surface offset from the support surface.

10. The pet toy in accordance with claim 9, wherein
the spheroid portion includes a first polyurethane foam and a second polyurethane foam that are mated together.

11. The pet toy in accordance with claim 10, wherein
the foot portion includes the first and second polyurethane foam.

12. The pet toy in accordance with claim 10, further comprising
a space separating a portion of the first polyurethane foam and a portion of the second polyurethane foam in the spheroid portion.

13. The pet toy in accordance with claim 12, wherein
the foot portion has a first density of the pet toy and the spheroid portion has a second density of the pet toy, the first density being greater than the second density.

14. The pet toy in accordance with claim 13, further comprising
a coating layer covering the spheroid portion and the foot portion.

15. The pet toy in accordance with claim 14, wherein
the coating layer includes liquid rubber that is applied and cured to the spheroid portion and the foot portion.

16. The pet toy of claim 9, wherein the flat bottom surface forms a substantially circular area between the fins.

17. The pet toy of claim 9, wherein the fins comprise:
a first fin integrally formed with the spheroid portion;
a second fin integrally formed with the spheroid portion; and
a third fin integrally formed with the spheroid portion.

18. A method of manufacturing a pet toy comprising:
mating a first polyurethane foam to a second polyurethane foam to form a core body of the pet toy having a cavity therebetween, the core body defining a football-like shape, the core body including an outer surface defining a groove having an overall serpentine-like shape;
forming a foot portion integrally attached to the core body, the foot portion having a flat bottom surface and a plurality of fins, the foot portion forming a stand for the core body, the plurality of fins each having an angular annular width that is greater than an angular annular distance between adjacent fins as measured at the flat bottom surface of the foot portion, the fins extending farther from the core body than the flat bottom surface, the fins configured to contact a support surface, the flat bottom surface offset from the support surface;
coating a rubber coating layer over an exterior surface of the core body; and
curing the rubber coating layer.

19. The method of claim 18, wherein the flat bottom surface forms a substantially circular area between the fins.

20. The method of claim 18, wherein the fins comprise:
a first fin integrally formed with the core body;
a second fin integrally formed with the core body; and
a third fin integrally formed with the core body.

* * * * *